US009421916B1

(12) United States Patent
Dyle

(10) Patent No.: US 9,421,916 B1
(45) Date of Patent: Aug. 23, 2016

(54) VEHICLE WITH COLLAPSIBLE SILICONE STORAGE BINS

(71) Applicant: GM GLOBAL TECHNOLOGY OPERATIONS LLC, Detroit, MI (US)

(72) Inventor: Taryn E. Dyle, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/704,325

(22) Filed: May 5, 2015

(51) Int. Cl.
*B60R 7/04* (2006.01)
*B60R 11/00* (2006.01)

(52) U.S. Cl.
CPC ........... *B60R 7/046* (2013.01); *B60R 2011/008* (2013.01); *B60R 2011/0042* (2013.01)

(58) Field of Classification Search
CPC ............ B60R 7/005; B60R 7/046; B60R 7/06
USPC .......... 296/37.5, 37.8, 37.12, 37.13; 229/67.3
See application file for complete search history.

(56) References Cited

U.S. PATENT DOCUMENTS

| | | | | |
|---|---|---|---|---|
| 1,984,150 A | * | 12/1934 | Ottinger | A45C 7/0063 383/40 |
| 3,088,771 A | * | 5/1963 | Weigle | B60N 3/08 224/275 |
| 3,632,029 A | * | 1/1972 | Sonner | B60N 3/08 224/275 |
| 3,730,581 A | * | 5/1973 | Parkinson | B60R 7/005 2/247 |
| 4,262,838 A | * | 4/1981 | Mackenzie | B24F 7/14 229/125.06 |
| 5,031,808 A | * | 7/1991 | Dolenc | B60R 7/046 224/280 |
| 5,261,716 A | * | 11/1993 | Phelps | B60R 7/046 296/152 |
| 6,047,879 A | * | 4/2000 | Henrikson | B42F 7/08 229/67.3 |
| 6,626,337 B1 | * | 9/2003 | Cox | B60N 3/08 224/275 |
| 6,682,115 B1 | * | 1/2004 | Tiesler | B60R 7/005 224/483 |
| 6,832,799 B2 | | 12/2004 | Haspel et al. | |
| 6,942,270 B1 | | 9/2005 | Mulvihill | |
| D533,325 S | * | 12/2006 | Bird | D34/1 |
| 7,678,271 B2 | | 3/2010 | Curtin | |
| 7,758,092 B2 | | 7/2010 | Kolpasky et al. | |
| 8,061,550 B2 | * | 11/2011 | Browne | B60R 7/043 220/666 |
| 2004/0262352 A1 | * | 12/2004 | Sturt | B60R 7/05 224/542 |
| 2011/0163092 A1 | | 7/2011 | Hacsi | |
| 2013/0168992 A1 | * | 7/2013 | Orlowsky | B60R 7/046 296/37.13 |
| 2013/0181000 A1 | | 7/2013 | Miksovsky et al. | |

FOREIGN PATENT DOCUMENTS

GB          1305189 A  *  1/1973  ............. B60R 7/005

* cited by examiner

*Primary Examiner* — Jason S Morrow
(74) *Attorney, Agent, or Firm* — Quinn Law Group, PLLC

(57) ABSTRACT

A storage bin for an interior compartment of a vehicle includes a support structure manufactured from a substantially rigid plastic material, and configured for attachment to a panel of the vehicle. An outer wall portion is manufactured from a substantially rigid plastic material. A flexible wall portion is manufactured from a flexible silicone material, and interconnects the support structure and the outer wall portion. The flexible wall portion includes a plurality of pleats, and is collapsible in an accordion motion between a collapsed position and an expanded position. When disposed in the collapsed position, the flexible wall portion supports the outer wall portion adjacent the panel. When disposed in the expanded position, the flexible wall portion supports the outer wall portion a lateral offset distance from the panel to define a storage compartment.

19 Claims, 5 Drawing Sheets

VEHICLE WITH COLLAPSIBLE SILICONE STORAGE BINS

TECHNICAL FIELD

The disclosure generally relates to a collapsible storage bin for a vehicle.

BACKGROUND

Most vehicles include a cargo area. The cargo area may be described as a trunk when associated with a sedan, but may also include other storage areas, such as the rearward space in an SUV or a van, the bed of a truck, etc. Often, the cargo area of a vehicle is equipped with a storage/organizational bin or net, in which objects may be placed so that the objects do not move during operation of the vehicle.

SUMMARY

A vehicle is provided. The vehicle includes a panel, and a collapsible storage bin attached to the panel. The collapsible storage bin includes a support structure attached to and disposed adjacent the panel, and an outer wall portion. A flexible wall portion interconnects the support structure and the outer wall portion. The flexible wall portion includes at least one pleat, and is collapsible in an accordion motion between a collapsed position and an expanded position. When disposed in the collapsed position, the flexible wall portion supports the outer wall portion adjacent the panel. When disposed in the expanded position, the flexible wall portion supports the outer wall portion a lateral offset distance from the panel to define a storage compartment.

A storage bin for a vehicle is also provided. The storage bin includes a support structure manufactured from a substantially rigid plastic material, and configured for attachment to a panel of the vehicle. An outer wall portion is manufactured from a substantially rigid plastic material. A flexible wall portion is manufactured from a flexible silicone material, and interconnects the support structure and the outer wall portion. The flexible wall portion includes a plurality of pleats, and is collapsible in an accordion motion between a collapsed position and an expanded position. When disposed in the collapsed position, the flexible wall portion supports the outer wall portion adjacent the panel. When disposed in the expanded position, the flexible wall portion supports the outer wall portion a lateral offset distance from the panel to define a storage compartment.

Accordingly, the storage bin allows a user to easily grasp and pull the outer wall to expand the flexible wall portion, thereby providing a convenient and easily accessible storage compartment. When not needed, the outer wall may be easily pressed to contract the flexible wall portion, so that the storage bin occupies very little space adjacent the panel. The container is always present, and easily deployed when needed, but can be stowed in a compact space to allow full use of a cargo area in which the storage bin is located.

The above features and advantages and other features and advantages of the present teachings are readily apparent from the following detailed description of the best modes for carrying out the teachings when taken in connection with the accompanying drawings.

DETAILED DESCRIPTION

Figure 1:
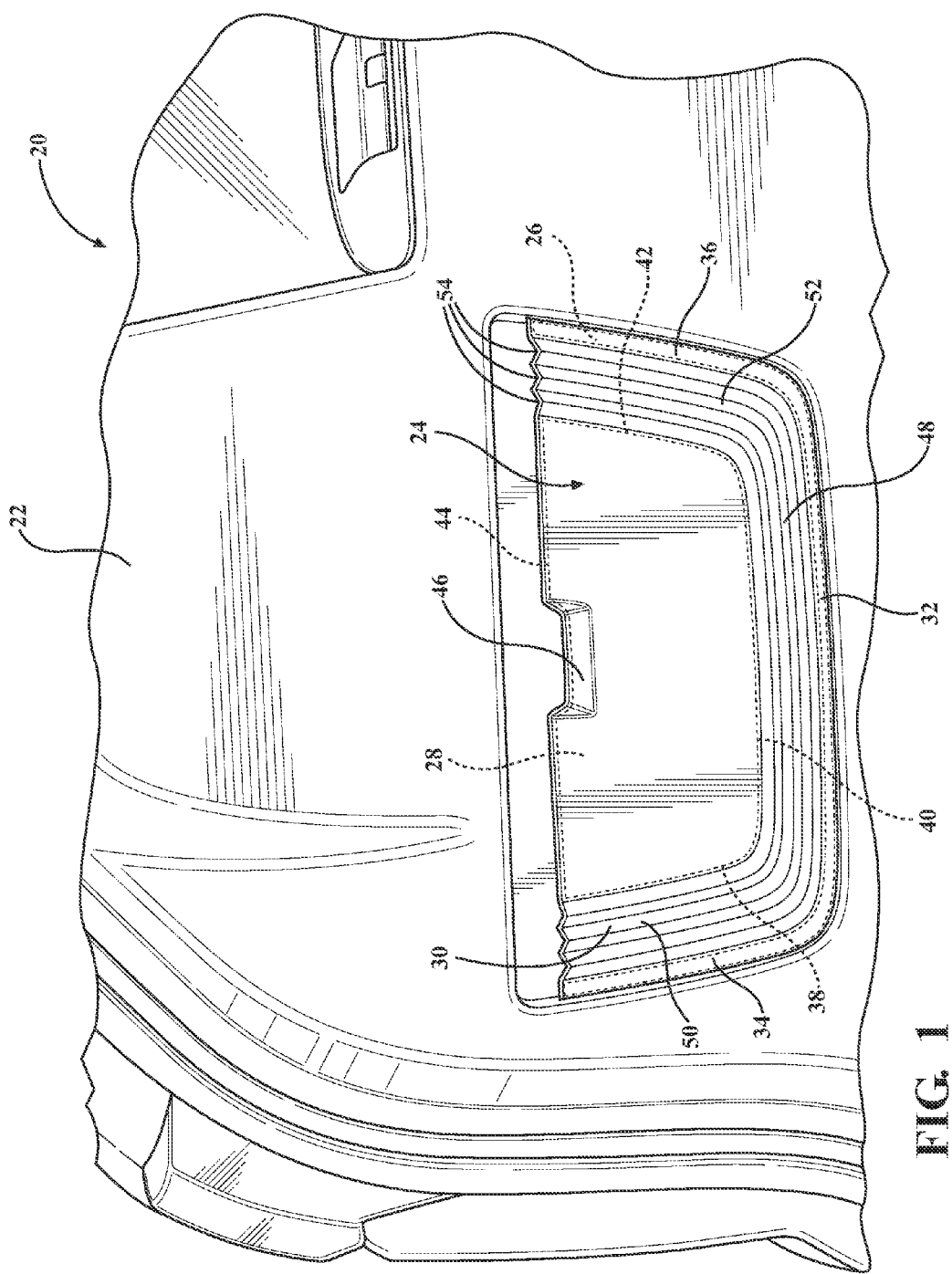
FIG. 1 is a schematic perspective view of a vehicle showing a storage bin in a stowed, collapsed position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any style and/or configuration of vehicle 20, such as but not limited to a sedan, SUV, van, truck, tractor, boat, airplane, etc. The vehicle 20 includes a panel 22. The panel 22 may, for example, include an interior trim panel 22 disposed within an interior space of the vehicle 20. It should be appreciated that the panel 22 may be disposed anywhere within the interior of the vehicle 20, including but not limited to on a door panel, on an interior console panel, on a seatback panel, etc. In other embodiments, the panel 22 may be disposed on exterior features of the vehicle 20 including, but not limited to, a side wall or tailgate of a vehicle 20 having a pick-up truck box. In some examples, the panel 22 is generally positioned in a substantially vertical orientation, such that the panel 22 extends in a generally vertical direction relative to a ground surface.

A collapsible storage bin 24 is attached to the panel 22. The collapsible storage bin 24 includes a support structure 26, an outer wall portion 28, and a flexible wall portion 30. The support structure 26 is attached to and disposed adjacent the panel 22, and supports the outer wall portion 28 and the flexible wall portion 30 relative to the panel 22. The support structure 26 may include and be manufactured from, for example, a substantially rigid polymer, such as a plastic or nylon material. However, it should be appreciated that the support structure 26 may include and be manufactured from some other material or combination of materials capable of supporting the components of the storage bin and any objects stored therein relative to the panel 22. For example, the support structure 26 may alternatively be manufactured from a metal or some other similar, rigid material.

As shown, the support structure 26 includes a lower section 32, a first side section 34, and a second side section 36. The first side section 34, the lower section 32, and the second side section 36 are arranged to define a substantially U-shaped structure having an open edge disposed at a top of the support structure 26, i.e., an upper side of the support structure 26. Alternatively, it is contemplated that the support structure 26 may include a planar plate like structure defining a generally rectangular shape.

The outer wall portion 28 may include and be manufactured from a substantially rigid polymer, such as a plastic or nylon material. It should be appreciated that the outer wall portion 28 may include and be manufactured from some other material or combination of materials, such as but not limited to a metal or other similar rigid material.

The outer wall portion 28 is a substantially planar, plate like structure that includes a first edge 38, a bottom edge 40, a second edge 42, and an upper edge 44. The outer wall portion 28 may be formed to include a handle 46, such as shown in the Figures. The handle 46 may be positioned along the upper edge 44 as is shown in the Figures. Alternatively, the handle 46 may be formed into a center of the outer wall portion 28.

The flexible wall portion 30 interconnects the support structure 26 and the outer wall portion 28. The flexible wall portion 30 supports the outer wall portion 28 relative to the support structure 26. Additionally, the flexible wall portion 30 must be capable of supporting any objects stored within the storage bin. The flexible wall portion 30 may include and be manufactured from a silicone based material. However, it should be appreciated that the flexible wall portion 30 may include and be manufactured from some other flexible material capable of supporting the outer wall portion 28 and any objects stored in the storage bin, as well as capable of being repeatedly moved in an accordion like fashion between a collapsed position, shown in FIG. 1, and an expanded position, shown in FIG. 2, to move the outer wall portion 28 between a stowed position, shown in FIG. 1, and an extended position, shown in FIG. 2. The flexible wall portion 30 may be over-molded onto each of the support structure 26 and the outer wall portion 28. However, it should be appreciated that the flexible wall portion 30 may be attached to the support structure 26 and the outer wall portion 28 in some other manner, such as but not limited to an adhesive or a plurality of fasteners.

Figure 2:
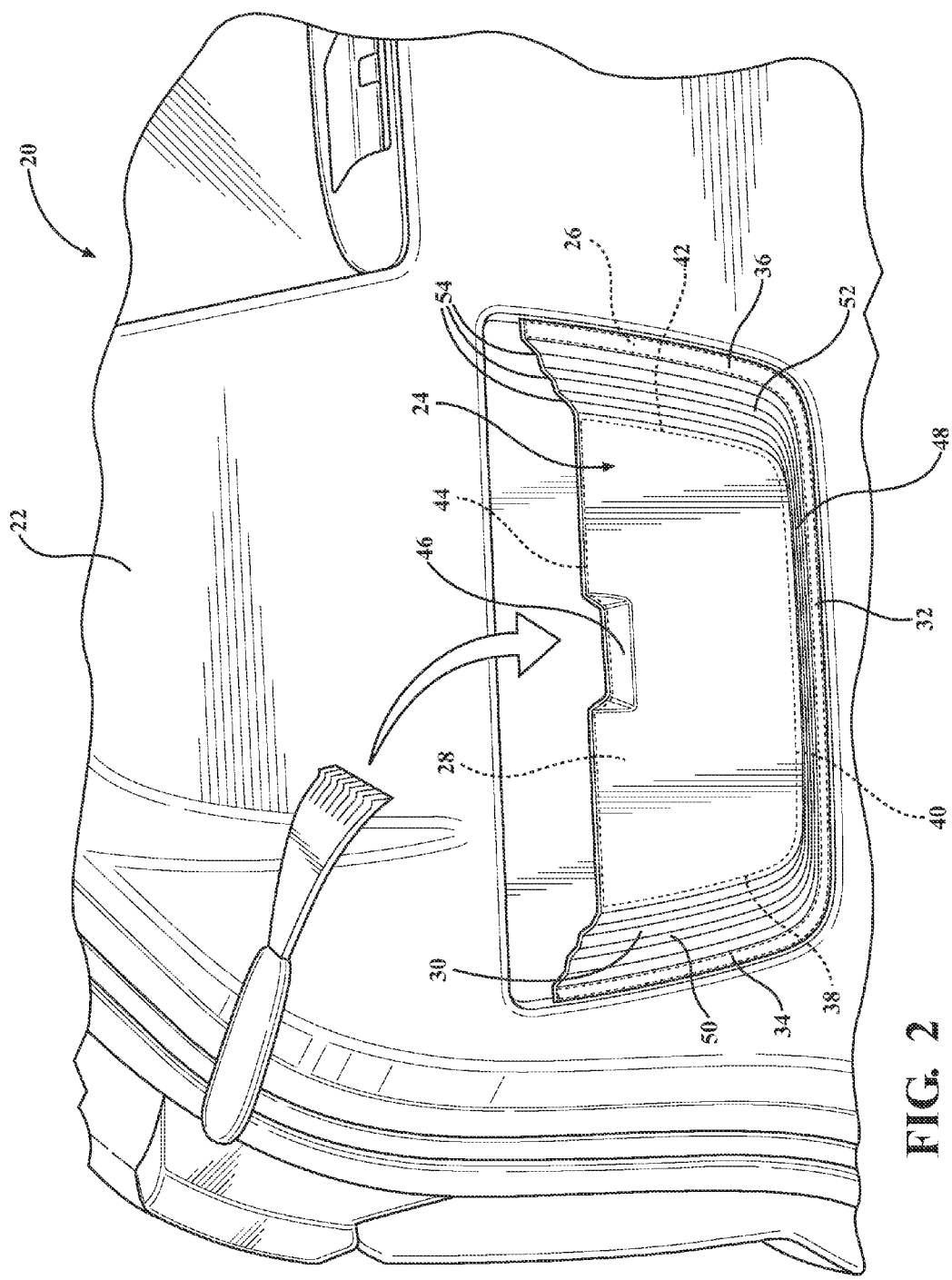
FIG. 2 is a schematic perspective view of the vehicle showing the storage bin in an expanded position.
Figure 3:
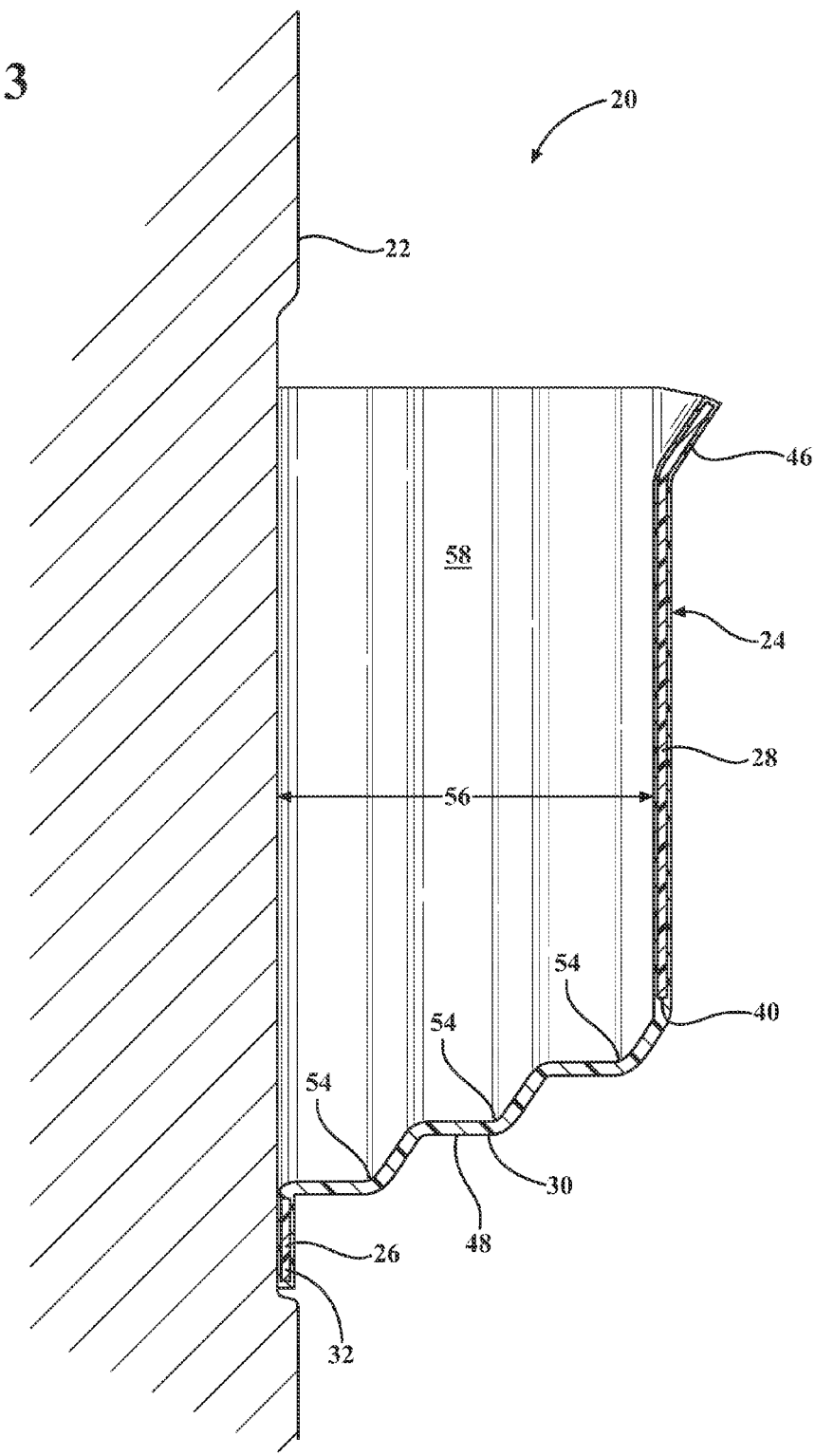
FIG. 3 is a schematic cross sectional view of the storage bin.

Referring to the embodiment of the storage bin 24 shown in FIGS. 1 through 3, the flexible wall portion 30 includes a lower wall portion 48, a first sidewall portion 50, and a second sidewall portion 52. The first sidewall portion 50, the lower wall portion 48, and the second sidewall portion 52 are arranged to define a substantially U-shaped wall having an open top, disposed along the upper edge 44 of the outer wall portion 28. The first sidewall portion 50 is disposed adjacent and extends parallel with the first side section 34 of the support structure 26, and the first edge 38 of the outer wall portion 28. The lower wall portion 48 is disposed adjacent and extends parallel with the lower section 32 of the support structure 26, and the bottom edge 40 of the outer wall portion 28. The second sidewall portion 52 is disposed adjacent and extends parallel with the second side section 36 of the support structure 26, and the second edge 42 of the outer wall portion 28. The first sidewall portion 50, the lower wall portion 48, the second side wall portion, the panel 22, and the outer wall portion 28 cooperate to define a storage compartment 58, generally shown in FIG. 2, when the flexible wall portion 30 is disposed in the expanded position.

Figure 4:
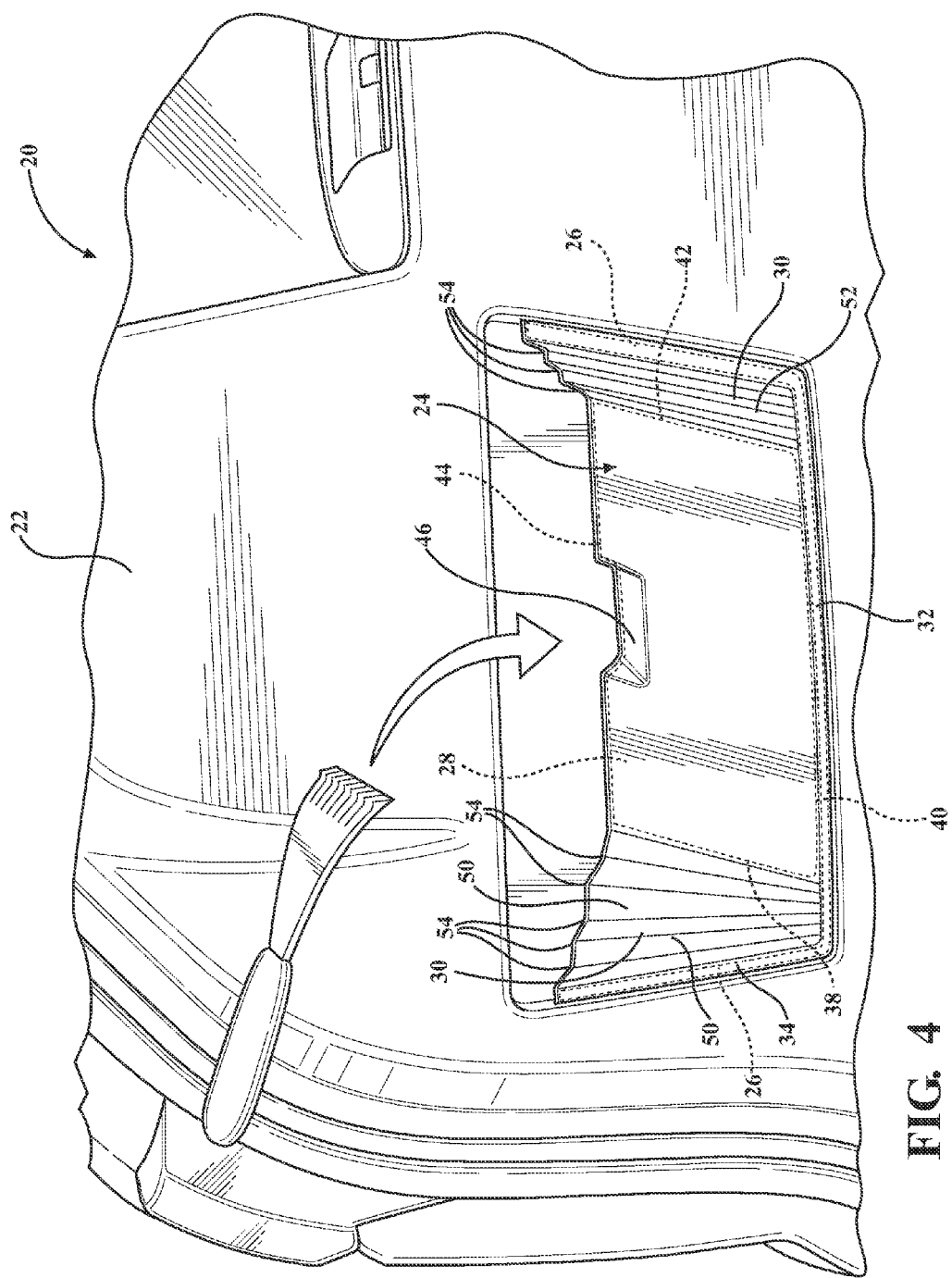
FIG. 4 is a schematic perspective view of an alternative embodiment of the storage bin.
Figure 5:
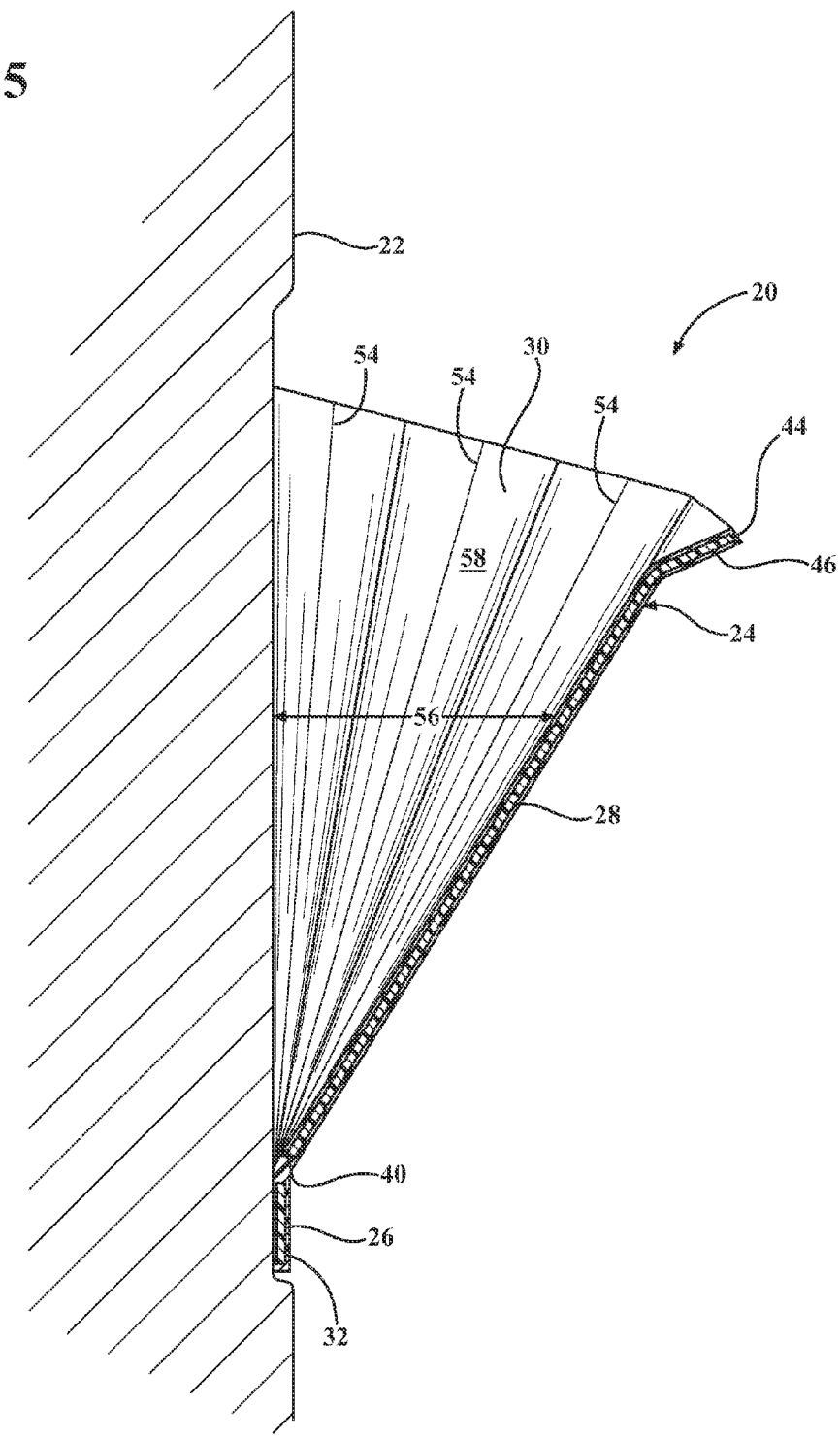
FIG. 5 is a schematic cross sectional view of the alternative embodiment of the storage bin.

Referring to the alternative embodiment of the storage bin 24 shown in FIGS. 4 and 5, the flexible wall portion 30 includes the first sidewall portion 50 and the second sidewall portion 52. The first sidewall portion 50 is disposed adjacent and extends parallel with the first side section 34 of the support structure 26, and the first edge 38 of the outer wall portion 28. The second sidewall portion 52 is disposed adjacent and extends parallel with the second side section 36 of the support structure 26, and the second edge 42 of the outer wall portion 28. The first sidewall portion 50, the second side wall portion, the panel 22, and the outer wall portion 28 cooperate to define a storage compartment 58, generally shown in FIG. 5, when the flexible wall portion 30 is disposed in the expanded position.

The flexible wall portion 30 includes at least one pleat 54, and preferably a plurality of pleats 54. The flexible wall portion 30 is collapsible in an accordion motion between the collapsed position supporting the outer wall portion 28 adjacent the panel 22, such as shown in FIG. 1, and the expanded position supporting the outer wall portion 28 a lateral offset distance 56 from the panel 22 to define the storage compartment 58, such as shown in FIGS. 2 and 4. It should be appreciated that the pleats 54 are configured in a manner suitable to allow the flexible wall portion 30 to move in the accordion like fashion between the collapsed position and the expanded position. When the flexible wall portion 30 is expanded, the pleats 54 provide sufficient resistance against movement to maintain the flexible wall portion 30 in the expanded position. As such, the flexible wall portion 30 is operable to support the outer wall portion 28 in the laterally offset, spaced relationship relative to the panel 22, without any additional connections or support attachments. However, with sufficient application of force by a user, the pleats 54 may be compressed to move the flexible wall portion 30 into the collapsed position, to store the outer wall portion 28 adjacent the panel 22.

As described above, with reference to the embodiment of the storage bin shown in FIGS. 1 through 3, the panel 22 is disposed in a substantially vertical orientation, along a substantially vertical plane. The pleats 54 are substantially parallel with the vertical plane and extend along the first edge 38, the bottom edge 40, and the second edge 42 of the outer wall portion 28 to define substantially U-shaped pleats 54 orientated in a substantially vertical orientation, with the vertically upper edge 44 open for receiving objects from above. As such, the pleats 54 extend only partially around a circumference of the outer wall portion 28, and do not extend around an entire circumference of the outer wall portion 28. As such, the pleats 54 do not define an endless loop around the outer wall portion 28. Specifically, the pleats 54 extend circumferentially along the first edge 38, the bottom edge 40, and second edge 42 of the outer wall portion 28. However, the pleats 54 do not extend along the upper edge 44 of the outer wall portion 28, because the flexible wall portion 30 does not extend along the upper edge 44 of the outer wall portion 28, and is not directly connected to the upper edge 44 of the outer wall portion 28.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A vehicle comprising:
a panel;
a collapsible storage bin attached to the panel, wherein the collapsible storage bin includes:
 a support structure attached to and disposed adjacent the panel;
 an outer wall portion;
 a flexible wall portion interconnecting the support structure and the outer wall portion, wherein the flexible wall portion includes at least one pleat and is collapsible in an accordion motion between a collapsed position supporting the outer wall portion adjacent the panel, and an expanded position supporting the outer wall portion a lateral offset distance from the panel to define a storage compartment; and wherein the flexible wall portion is over-molded onto each of the support structure and the outer wall portion.

2. The vehicle set forth in claim 1 wherein the flexible wall portion is a silicone based material.

3. The vehicle set forth in claim 2 wherein the support structure is a substantially rigid polymer.

4. The vehicle set forth in claim 3 wherein the outer wall portion is a substantially rigid polymer.

5. The vehicle set forth in claim 1 wherein the flexible wall portion includes a lower wall portion, a first sidewall portion, and a second sidewall portion, arranged to define a substantially U-shaped wall having an open top.

6. The vehicle set forth in claim 5 wherein the support structure includes a lower section, a first side section, and a second side section, arranged to define a substantially U-shaped wall having an open top.

7. The vehicle set forth in claim 5 wherein the first sidewall portion, the lower wall portion, the second side wall portion, the panel, and the outer wall portion cooperate to define a storage volume when the flexible wall portion is disposed in the expanded position.

8. The vehicle set forth in claim 6 wherein the outer wall portion includes a first edge, a bottom edge, a second edge, and an upper edge, and wherein the at least one pleat extends circumferentially along the first edge, the bottom edge, and second edge of the outer wall portion.

9. The vehicle set forth in claim 8 wherein the flexible wall portion is not connected to the upper edge of the outer wall portion.

10. The vehicle set forth in claim 8 wherein the at least one pleat does not extend around an entire circumference of the outer wall portion.

11. The vehicle set forth in claim 10 wherein the at least one pleat does not extend along the upper edge of the outer wall portion.

12. The vehicle set forth in claim 11 wherein the at least one pleat includes a plurality of pleats.

13. The vehicle set forth in claim 1 wherein the outer wall portion includes a handle.

14. The vehicle set forth in claim 1 wherein the panel is disposed along a substantially vertical plane, and wherein the at least one pleat is substantially parallel with the vertical plane and extends along a first edge, a bottom edge, and a second edge of the outer wall portion to define a substantially U-shaped pleat orientated in a substantially vertical orientation with the vertically upper edge open for receiving objects from above.

15. A storage bin for a vehicle, the storage bin comprising:
a support structure manufactured from a substantially rigid plastic material and configured for attachment to a panel of the vehicle;
an outer wall portion manufactured from a substantially rigid plastic material; and
a flexible wall portion, manufactured from a flexible silicone material, and interconnecting the support structure and the outer wall portion;
wherein the flexible wall portion includes a plurality of pleats and is collapsible in an accordion motion between a collapsed position supporting the outer wall portion adjacent the panel for storage, and an expanded position supporting the outer wall portion a lateral offset distance from the panel to define a storage compartment.

16. The storage bin set forth in claim 15 wherein:
the flexible wall portion includes, a first sidewall portion, a lower wall portion, and a second sidewall portion, arranged to define a substantially U-shaped wall having an open top;
the outer wall portion includes a first edge adjacent the first sidewall portion, a bottom edge adjacent the lower wall portion, a second edge adjacent the second sidewall portion, and an upper edge; and wherein
the plurality of pleats extend circumferentially along the first edge, the bottom edge, and second edge of the outer wall portion, and do not extend along the upper edge of the outer wall portion.

17. The storage bin set forth in claim 16 wherein the flexible wall portion is not connected to the upper edge of the outer wall portion.

18. The storage bin set forth in claim 17 wherein the outer wall portion includes a handle.

19. The storage bin set forth in claim 16 wherein the plurality of pleats are disposed substantially parallel with a vertical plane and extend along the first edge, the bottom edge, and the second edge of the outer wall portion to define a substantially U-shaped pleat orientated in a substantially vertical orientation open from above.

* * * * *